Patented Dec. 26, 1944

2,365,950

UNITED STATES PATENT OFFICE 2,365,950

METHOD OF OBTAINING RUBBER FROM GOLDENROD

John W. Haefele, Ridgewood, and John McGavack, Leonia, N. J., assignors to United States Rubber Company, New York, N. Y., a corporation of New Jersey No Drawing. Application September 11, 1942, Serial No. 457,973

4 Claims. (Cl. 260—814)

This invention relates to a method of obtaining rubber from goldenrod.

At the present time rubber is commercially obtained from plants, such as Guayule, by mechanically disintegrating the whole shrub in the presence of water, as by ball-milling the ground-up plant, whereupon the rubber becomes agglomerated and separates from the remaining portions of the plant by floating on the water. This method has also been applied to obtain rubber from the bark and scrap cuttings of Hevea brasiliensis. When this method was applied to goldenrod leaves, very severe foaming took place and no rubber was found floating on the surface after the foam had subsided, even though the rubber content of the leaves was around 5% to 6%, as determined by benzene extraction methods.

According to the present invention, we have discovered that the rubber content of goldenrod leaves may be readily recovered by mechanically disintegrating the plant material in a dilute alkali hydroxide solution. When the goldenrod plant material, such as the leaves, is mechanically disintegrated as by ball-milling, in an alkali hydroxide solution, foaming is practically eliminated and the rubber content of the goldenrod readily floats to the surface after the ball-milling operation. The term "alkali" includes the alkali metals and ammonia, but not the alkaline-earth metals. About 1% to 5% solution of alkali hydroxide is satisfactory. We believe that the effect of the alkali hydroxide is to dissolve the lignins and resins which bind the rubber in such a plant as goldenrod, and thereby release the rubber. In this way, the rubber recovered is considerably purified. Also, the alkali hydroxide represses the foam forming characteristics due to the natural saponin-like materials in the goldenrod. Since all of the resins present in the leaves will not react with alkali hydroxide to form soluble materials, there is a further advantage in extracting the goldenrod plant with acetone prior to mechanically disintegrating in the dilute alkali solution. Analyses of goldenrod leaves show acetone extracts (3 hours extraction) of about 10 to 25%.

The advantages of the present invention are readily shown in the following examples:

Example I

In a one-quart pebble-mill jar were placed 15 grams of dry goldenrod leaves, 350 cc. of water and 270 grams of pebbles. After four days rotation of this mix with a little formaldehyde present as a preservative, the jar was opened and a very heavy foam was found. When the foam had slowly subsided, no rubber could be observed on the surface of the water. The liquid was then rendered alkaline by addition of a small amount of sodium hydroxide, and after one more day of pebble-milling, drops of the goldenrod rubber were found floating on the surface of the alkaline slurry with no troublesome foam, as in the case of the previous maceration with water alone.

Example II 15 grams of dry goldenrod leaves were placed in a one-quart pebble-mill jar with 288 cc. of water, 12 grams of sodium hydroxide, and 270 grams of stones. The contents were pebble-milled for three days whereupon a yield of .85 gram of rubber was collected. This was 90% of the amount found to be present by benzene extraction determination.

Example III

In a one-gallon porcelain pebble-mill jar were placed 80 grams of dry goldenrod leaves which had previously been extracted for three hours with acetone. To this were added 1530 cc. of water containing 64 grams of sodium hydroxide and 1460 grams of pebbles. After 57 hours of rotation the jar was opened and the yield of goldenrod rubber floated up in the form of 10 to 15 discs. These were firmer and not as sticky as the rubber obtained in Example II. The dried rubber was green and weighed 4.7 grams, approximately the total amount of rubber shown to be present by a benzene extraction determination of the original sample.

Example IV

In a one-gallon porcelain ball-mill were placed 60 grams of dry goldenrod leaves, 980 cc. of water, 170 grams of 28% ammonia, and 1100 grams of stones. The contents were pebble-milled for 66 hours. At the end of this time the mill was opened, and rubber was found floating on the liquid contents.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. Method of obtaining rubber from goldenrod which comprises extracting dry goldenrod plant material with a resin solvent which is a non-solvent of rubber, mechanically disintegrating the thus treated goldenrod in an aqueous medium containing a small amount of alkali hydroxide until the rubber floats on the aqueous medium, and separating the rubber from the alkaline slurry.

2. Method of obtaining rubber from goldenrod which comprises extracting dry goldenrod plant material with acetone, mechanically disintegrating the thus treated goldenrod in an aqueous medium containing a small amount of alkali hydroxide until the rubber floats on the aqueous medium, and separating the rubber from the alkaline slurry.

3. Method of obtaining rubber from goldenrod which comprises extracting dry goldenrod plant material with a resin solvent which is a non-solvent of rubber, mechanically disintegrating the thus treated goldenrod in water containing about 1% to 5% alkali hydroxide until the rubber floats on the aqeuous medium, and separating the rubber from the alkaline slurry.

4. Method of obtaining rubber from goldenrod which comprises extracting dry goldenrod plant material with acetone, mechanically disintegrating the thus treated goldenrod in water containing about 1% to 5% alkali hydroxide until the rubber floats on the aqueous medium, and separating the rubber from the alkaline slurry.

JOHN W. HAEFELE.
JOHN McGAVACK.